(12) United States Patent
Park et al.

(10) Patent No.: US 9,959,184 B2
(45) Date of Patent: May 1, 2018

(54) INPUT/OUTPUT (I/O) LINE TEST DEVICE AND METHOD FOR CONTROLLING THE SAME

(71) Applicant: SK hynix Inc., Icheon-si Gyeonggi-do (KR)

(72) Inventors: Min Su Park, Seoul (KR); Young Jun Ku, Seoul (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 244 days.

(21) Appl. No.: 14/879,531

(22) Filed: Oct. 9, 2015

(65) Prior Publication Data

US 2016/0364309 A1 Dec. 15, 2016

(30) Foreign Application Priority Data

Jun. 12, 2015 (KR) .................. 10-2015-0083636

(51) Int. Cl.
  *G06F 11/27* (2006.01)
  *G06F 13/42* (2006.01)
  *G06F 11/30* (2006.01)
  *G06F 11/34* (2006.01)

(52) U.S. Cl.
  CPC .......... *G06F 11/27* (2013.01); *G06F 11/3051* (2013.01); *G06F 11/3485* (2013.01); *G06F 13/4282* (2013.01)

(58) Field of Classification Search
  CPC .... G06F 11/3485; G06F 11/263; G06F 11/27; G06F 11/273; G06F 13/4282
  USPC .............. 324/762.06, 762.01, 762.02; 702/117–120; 257/203
  See application file for complete search history.

(56) References Cited

U.S. PATENT DOCUMENTS

| 4,794,599 | A | * | 12/1988 | Purcell | ............. | G01R 31/31915 714/719 |
| 5,293,123 | A | * | 3/1994 | Jordan | ............. | G01R 31/31715 324/762.02 |
| 6,356,096 | B2 | * | 3/2002 | Takagi | ............. | G01R 31/31937 324/756.07 |
| 6,397,361 | B1 | * | 5/2002 | Saitoh | .................... | G11C 29/02 324/73.1 |
| 7,480,194 | B2 | * | 1/2009 | Lee | .......................... | G11C 5/04 365/189.17 |
| 8,801,279 | B2 | * | 8/2014 | Kim | ........................ | G01K 7/01 374/152 |

(Continued)

*Primary Examiner* — Jermele M Hollington
*Assistant Examiner* — Sean Curtis
(74) *Attorney, Agent, or Firm* — William Park & Associates Ltd.

(57) ABSTRACT

An input/output (I/O) line test device and a method for controlling the same are disclosed, which may relate to a technology for testing a base die having no cell using various patterns. The I/O line test device may include an interface controller configured to perform signal transmission/reception between a pad and an input/output line (IOL), and a signal transceiver configured to perform signal transmission/reception between the IOL and a through silicon via (TSV). The I/O line test device may include a latch unit configured to latch output data of the signal transceiver, and a test controller configured to output a control signal for controlling whether the signal transceiver performs a reception operation in response to a write enable signal and a test signal.

25 Claims, 3 Drawing Sheets

(56) References Cited

U.S. PATENT DOCUMENTS

| | | | |
|---|---|---|---|
| 8,922,237 B2* | 12/2014 | Ku | H01L 22/22 324/750.01 |
| 9,019,778 B2* | 4/2015 | Kim | G11C 5/06 365/189.03 |
| 9,196,382 B2* | 11/2015 | Lee | G11C 29/12015 |
| 9,239,359 B2* | 1/2016 | Marinissen | G01R 31/318508 |
| 9,423,454 B2* | 8/2016 | Kim | G01R 31/31703 |
| 9,502,384 B2* | 11/2016 | Yoon | H01L 25/0657 |
| 9,530,464 B2* | 12/2016 | Byeon | G11C 7/10 |
| 2005/0226058 A1* | 10/2005 | Lee | G11C 5/04 365/189.05 |
| 2007/0091693 A1* | 4/2007 | Lee | G11C 5/04 365/189.05 |
| 2011/0093235 A1* | 4/2011 | Oh | G01R 31/2884 702/120 |
| 2011/0102006 A1* | 5/2011 | Choi | G01B 31/318513 324/750.3 |
| 2012/0007250 A1* | 1/2012 | Ku | H01L 23/481 257/774 |
| 2012/0105093 A1* | 5/2012 | Lee | G01R 31/2853 324/762.01 |
| 2013/0024737 A1* | 1/2013 | Marinissen | G01R 31/318508 714/727 |
| 2015/0012791 A1* | 1/2015 | Kim | G01R 31/31716 714/744 |
| 2015/0061725 A1* | 3/2015 | Lee | G01B 31/318513 324/762.02 |
| 2015/0115268 A1* | 4/2015 | Park | G11C 7/10 257/48 |
| 2015/0213907 A1* | 7/2015 | Lee | G11C 29/12015 714/719 |
| 2016/0012864 A1* | 1/2016 | Park | G11C 29/46 365/51 |
| 2016/0196857 A1* | 7/2016 | Lee | G11C 5/02 365/189.02 |
| 2016/0364309 A1* | 12/2016 | Park | G06F 11/27 |

* cited by examiner

INPUT/OUTPUT (I/O) LINE TEST DEVICE AND METHOD FOR CONTROLLING THE SAME

CROSS-REFERENCE TO RELATED APPLICATION

This application claims priority based upon Korean patent application No. 10-2015-0083636, filed on Jun. 12, 2015, the disclosure of which is hereby incorporated in its entirety by reference herein.

BACKGROUND

1. Technical Field

Embodiments of the present disclosure generally relate to an input/output (I/O) line test device and a method for controlling the same, and more particularly to a technology for testing a base die having no cell using various patterns.

2. Related Art

Recently, semiconductor devices having semiconductor chips that are stacked and using through silicon via (TSV) have been researched and developed. For example, multi-chip packages are one representative example of a multi-chip package in which plural semiconductor chips are vertically stacked and designed to transmit/receive signals using a through silicon via (TSV). These multi-chip packages have been recently developed and used.

Electronic industries have been rapidly developed to implement low-priced products having lighter weights, smaller sizes, higher speeds, multifunctional abilities, higher performances, and greater reliability. One of the important technologies used to attain goals related to product designs is to use a multi-chip stacked package technology or a system-in-package technology. The multi-chip stacked package technology or the system-in-package technology may use through silicon via (TSV).

The multi-chip stacked package technology or the system-in-package technology may enable functions of plural semiconductor devices to be performed in one semiconductor package. Although the multi-chip stacked package or the system-in-package may be greater in thickness than a general single-chip package, the multi-chip stacked package or the system-in-package is very similar in planar size to the single-chip package. As a result, the multi-chip stacked package and the system-in-package have been widely used in mobile products having higher performances and smaller sizes, for example, mobile phone, laptops, memory cards, mobile camcorders, etc.

When fabricating the semiconductor package, a testing process may be performed to determine whether the semiconductor device operates normally. Using this testing process while fabricating may result in an increase in production efficiency. The testing process of the semiconductor device may include applying an electric signal to the pad of the semiconductor device, and determining whether output data is normal.

The semiconductor devices (e.g., DRAMs) may write various data in a cell, read the various data patterns from the cell, and thus test input/output (I/O) lines. If the I/O lines are connected to each other, opposite data may be written only in a small number of I/O lines and then may be read from the small number of I/O lines, such that it may be possible to determine the influence of such connection between the I/O lines. In addition, a margin between each pin and the I/O lines may be tested by reading previously written data.

However, when at least two chips are stacked to perform one operation in the same manner as in a high bandwidth memory (HBM), the at least two chips must be tested in different ways.

That is, if two different chips are combined and integrated with each other, all the I/O lines can be tested. However, when testing each chip, only one input line and output line can be tested for each chip, resulting in a limitation in chip testing.

SUMMARY

In accordance with an embodiment there may be provided an input/output (I/O) line test device. The I/O line test device may include an interface controller configured to perform signal transmission/reception between a pad and an input/output line (IOL). The I/O line test device may include a signal transceiver configured to perform signal transmission/reception between the input/output line (IOL) and a through silicon via (TSV). The I/O line test device may include a latch unit configured to latch output data of the signal transceiver. The I/O line test device may include a test controller configured to output a control signal for controlling whether the signal transceiver performs a reception operation in response to a write enable signal and a test signal.

In accordance with an embodiment an input/output (I/O) line test device may be provided. The I/O line test device may include a first transmitter configured to output data received from a pad to an input/output line (IOL) when a write enable signal is activated. The I/O line test device may include a first receiver configured to output data received from the input/output line (IOL) to the pad during a read enable signal is activated. The I/O line test device may include a second receiver configured to output data received from the input/output line (IOL) when a control signal is activated. The I/O line test device may include a latch unit configured to store data received from the second receiver. The I/O line test device may include a second transmitter configured to output data of the latch unit to the input/output line (IOL) during the read/write enable signals are activated. The I/O line test device may include a test controller configured to output the control signal for controlling whether to operate the second receiver in response to the write enable signal and a test signal.

In accordance with an embodiment an input/output (I/O) line test method may be provided. The I/O line test method may include during a write operation, receiving, by a second receiver, first data received from a first transmitter through an input/output line (IOL), and storing the first data in a latch unit. The I/O line test method may include stopping an operation of the second receiver when the test signal is activated, and applying second data received through the first transmitter to the input/output line (IOL. The I/O line test method may include during a read operation, outputting the first data stored in the latch unit to a pad after passing through a second transmitter, the input/output line (IOL), and a first receiver.

In accordance with an embodiment, an input/output (I/O) line test device may be provided. The I/O line test device may include a latch unit configured for storing a first data, and a pad. The I/O line test device may include an I/O line coupled between the latch unit and the pad. The I/O line test device is configured to provide the first data through the pad after second data is stored in the I/O line to verify the operation of the I/O line.

An input/output (I/O) line test device comprising: a latch unit configured for storing a first data; a pad; and an I/O line coupled between the latch unit and the pad, wherein the I/O line test device is configured to provide the first data through the pad after second data is stored in the I/O line to verify the operation of the I/O line.

An interface controller coupled between the pad and the I/O line; and a signal transceiver coupled between the I/O line and the latch unit, wherein, during a write operation of the I/O line test device, receiving, by the signal transceiver, the first data received from the interface controller through the I/O line, and storing the first data in the latch unit.

A test controller coupled to the signal transceiver and configured to output a control signal for controlling whether the signal transceiver performs a reception operation in response to a write enable signal and a test signal.

The test controller is configured to prevent the operation of the signal transceiver in response to an active test signal to apply the second data received through the interface controller to the I/O line.

A read operation, outputting the first data stored in the latch unit to the pad after passing through the signal transceiver, the I/O line, and the interface controller.

The latch unit is located within a base die and the base die is coupled to a core die by a through silicon via.

An interface controller configured to perform signal transmission/reception between the pad and the I/O line; a signal transceiver configured to perform signal transmission/reception between the I/O line and a through silicon via (TSV); and a test controller configured to output a control signal for controlling whether the signal transceiver performs a reception operation in response to a write enable signal and a test signal, wherein the latch unit is configured to latch output data of the signal transceiver.

DETAILED DESCRIPTION

Reference will now be made to embodiments of the present disclosure, examples of which are illustrated in the accompanying drawings. Wherever possible, the same reference numbers are used throughout the drawings to refer to the same or like portions. In the following description of the present disclosure, a detailed description of related known configurations or functions incorporated herein may be omitted for clarity of the subject matter of the present disclosure.

Various embodiments of the present disclosure may be directed to providing an input/output (I/O) line test device and a method for controlling the same that substantially obviate one or more problems due to limitations and disadvantages of the related art.

The embodiments of the present disclosure may generally relate to an I/O line test device and a method for controlling the same, which can test a base die having no cell using various patterns.

Figure 1:
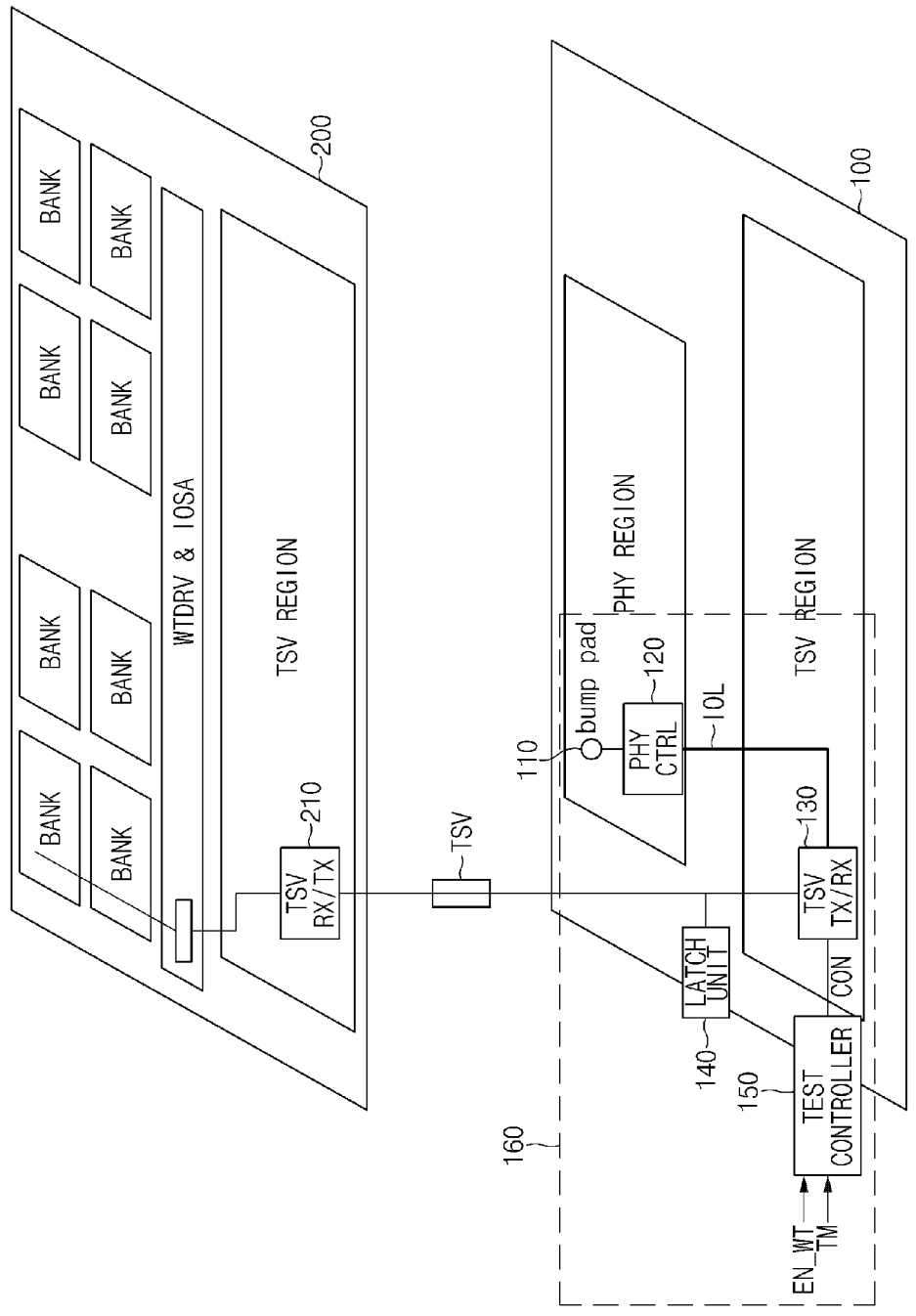
FIG. 1 is a conceptual diagram illustrating an example of a multi-chip stacked package according to an embodiment of the present disclosure.

FIG. 1 is a conceptual diagram illustrating an example of a multi-chip stacked package according to an embodiment of the present disclosure.

Referring to FIG. 1, the multi-chip stacked package may include a base die 100 and a core die 200.

The core die 200 may be stacked over the base die 100, and the base die 100 and the core die 200 may be interconnected through a through silicon via (TSV).

In this example, the base die 100 may include a memory interface (PHY) region and a TSV region.

The memory interface (PHY) region may use, for example, a bump pad 110 as an I/O pad. That is, a plurality of chips may be connected through a TSV within a semiconductor package, and the bump pad 110 may be used to implement communication between TSVs of respective chips.

The memory interface (PHY) region may include an interface controller 120 configured to transmit a signal of the bump pad 110 to the I/O line (IOL). The TSV region may include a signal transmission/reception (Tx/Rx) unit (also known as a signal transceiver) 130 configured to implement communication between the IOL and the TSV.

The core die 200 may include a plurality of banks (BANKs), a write driver (WTDRV), an I/O sense-amplifier (IOSA), and a TSV region.

The core die 200 may include a plurality of banks (BANKs) configured to store data therein. The write driver (WTDRV) may control the operation for writing data in the plurality of banks (BANKs). The IOSA may control the operation for reading data from the plurality of banks (BANKs). The TSV region may include a TSV and signal Tx/Rx unit 210 configured to transmit/receive signals to/from the base die 100 through a TSV.

If logic high data is input through the bump pad 110, the logic high data is stored in the bank (BANK) through the signal Tx/Rx unit 130 and the TSV and signal Tx/Rx unit 210.

If the base die 100 is coupled to the core die 200 to test a connection between the input/output lines (IOLs), different data may first be written in the cell and then read by alternately changing an address to another address.

The base die 100 and the core die 200 are tested under the condition that respective chips of the base die 100 and the core die 200 are not coupled to each other, and it is confirmed that all operations of the base die 100 and the core die 200 are normal, such that the base die 100 is coupled to the core die 200 through a TSV after completion of such confirmation.

Therefore, it is necessary for the base die 100 and the core die 200 to be tested on the condition that two chips are not coupled to each other. However, since the base die 100 having no cell does not have a space for storing data therein, the base die 100 must read the last written data.

If the last written data is read without change, it is impossible to test the corresponding IOL as well as to verify a margin of the IOL.

Therefore, the I/O line (IOL) test device 160 illustrated in FIG. 1 is used so that the IOL can be tested using the IOL test device 160. The IOL test device 160 may include a bump pad 110, an interface controller 120, an input/output line (IOL), a signal transmission/reception (Tx/Rx) unit (also known as a signal transceiver) 130, a latch unit 140, and a test controller 150. The test controller 150 may control whether to operate the signal Tx/Rx unit 130 according to the write enable signal (EN_WT) and the test signal (TM).

Figure 2:
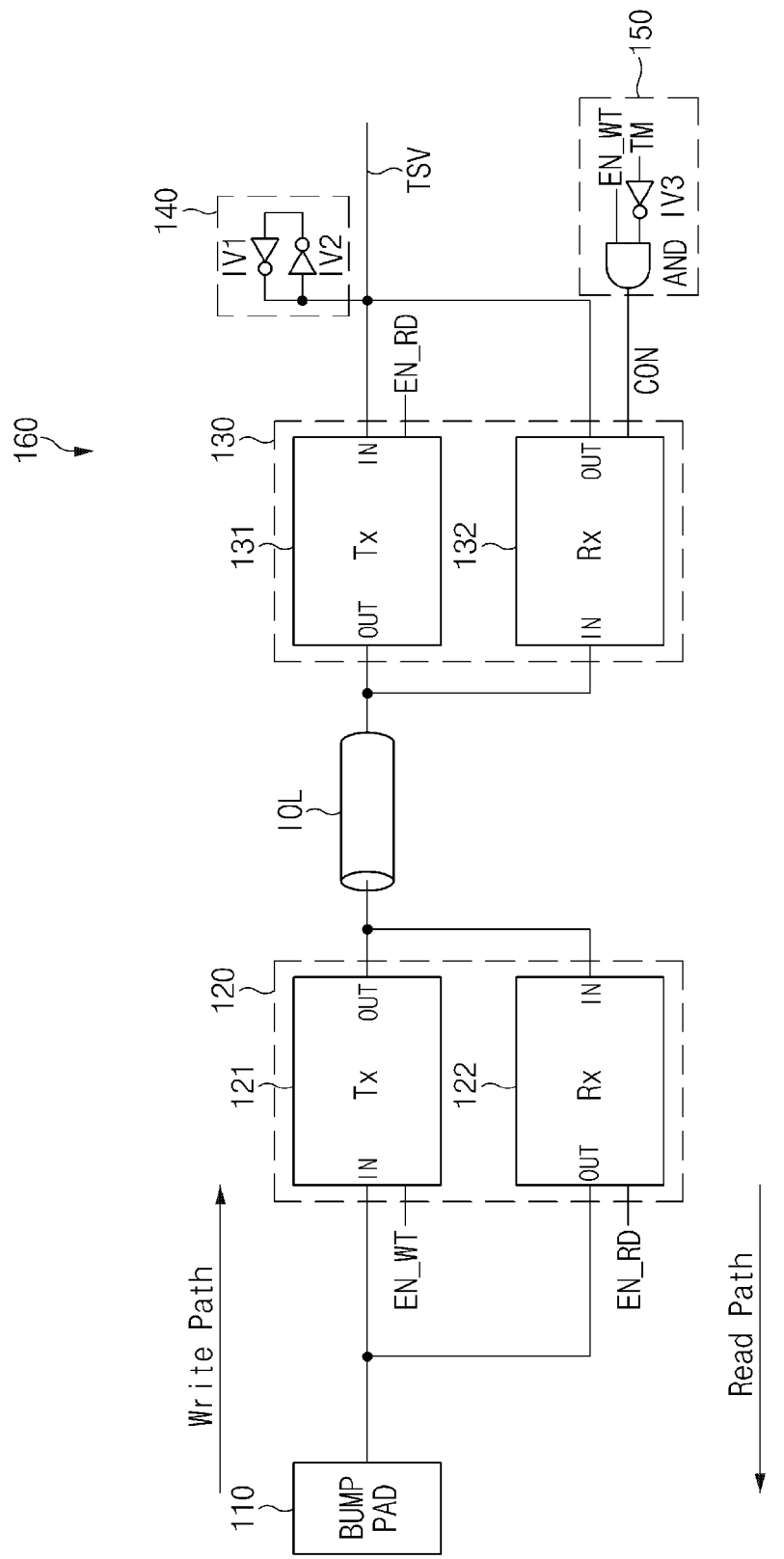
FIG. 2 is a circuit diagram illustrating a representation of an example of an input/output (I/O) line test device according to an embodiment of the present disclosure.

FIG. 2 is a circuit diagram illustrating a representation of an example of the input/output line (IOL) test device 160 according to an embodiment of the present disclosure.

Referring to FIG. 2, the IOL test device 160 may be included in the base die 100 illustrated in FIG. 1.

The base die 100 may include a bump pad, an interface controller 120, an input/output line (IOL), a signal transmission/reception (Tx/Rx) unit (also known as a signal transceiver) 130, a latch unit 140, and a test controller 150. In this example, the interface controller 120 may include a transmitter 121 and a receiver 122. The signal Tx/Rx unit (signal transceiver) 130 may include a transmitter 131 and a receiver 132.

The interface controller 120 may control signal transmission/reception (i.e., signal communication) between the bump pad 110 and the IOL. The signal Tx/Rx unit 130 may control signal transmission/reception (i.e., signal communication) between the IOL and the TSV.

If the write enable signal (EN_WT) is activated (or enabled) during the write operation, the transmitter 121 may transmit a signal of the bump pad 110 to the IOL. If the read enable signal (EN_RD) is activated (or enabled) during the read operation, the receiver 122 may receive a signal from the IOL, and transmit the received signal to the bump pad 110.

If the read enable signal (EN_RD) is activated during the read operation, the transmitter 131 may output the signal stored in the latch unit 140 to the IOL. If the write enable signal (EN_WT) is activated during the write operation, the receiver 132 may receive a signal from the IOL, and transmit the received signal to the latch unit 140.

The latch unit 140 may include inverters (IV1, IV2) connected to each other in a latch form, so that the latch unit 140 may store data received from the receiver 132 during the write operation. Since the input/output line (IOL) is located far away from the TSV, IOL data may be temporarily stored in the latch unit 140.

The test controller 150 may output a control signal (CON) for determining whether to operate the receiver 132 to receive in response to the write enable signal (EN_WT) and the test signal (TM).

The test controller 150 may include an AND gate (AND) and an inverter IV3. In this example, the AND gate (AND) may receive the write enable signal (EN_WT) and the test signal (TM) inverted by the inverter IV3, and perform a logic AND operation between the write enable signal (EN_WT) and the inverted test signal (TM).

For example, if the test signal (TM) is activated to a high level, the control signal (CON) is at a low level such that the operation of the receiver 132 is prevented. In contrast, assuming that the test signal (TM) is at a low level, if the write enable signal (EN_WT) is activated to a high level, the control signal (CON) is at a high level, such that the receiver 132 starts reception.

Figure 3:
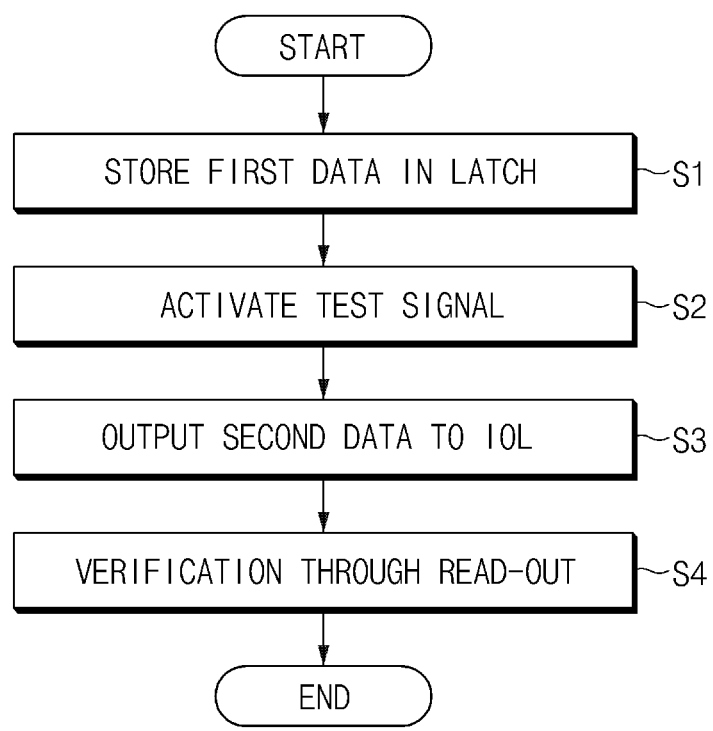
FIG. 3 is a flowchart illustrating example operations of the input/output (I/O) line test device according to an embodiment of the present disclosure.

FIG. 3 is a flowchart illustrating example operations of the input/output line (IOL) test device according to an embodiment of the present disclosure.

Referring to FIG. 3, if the write enable signal (EN_WT) is activated during the write operation, the transmitter 121 starts operation. For example, if first "high" data is input through the bump pad, the transmitter 121 may output logic high data through the input/output line (IOL).

In this example, the test signal (TM) may be deactivated to a low level. Thus, if the write enable signal (EN_WT) is activated to a high level, the control signal (CON) is at a high level, such that the receiver 132 starts operation.

As a result, first "high" data received from the input/output line (IOL) may be stored in the latch unit 140 in step S1. In other words, logic "high" data desired to be output in the read mode may first be stored in the latch unit 140.

Thereafter, if the test signal (TM) is activated in step S2, the control signal (CON) is at a low level, the receiver 132 does not operate.

Subsequently, second "low" data is input through the bump pad 110. That is, logic low data being opposite to the first "high" data may be written.

If the write enable signal (EN_WT) is activated, the transmitter 121 starts operation such that logic low data is applied to the IOL in step S3. Here, since the test signal (TM) is activated, the receiver 132 is turned off.

Therefore, low data received from the transmitter 121 is blocked by the receiver 132, and then stays in the IOL. During the write operation mode, data stored in the IOL may be maintained in the last logic low data. In this example, since the receiver 132 does not operate, logic high data stored in the latch unit 140 may remain unchanged even when second low data is applied to the receiver 132.

Subsequently, data stored in the latch unit 140 is read out during the read operation, such that data of the input/output line (IOL) is tested in step S4.

That is, if the read enable signal (EN_RD) is activated during the read operation, the transmitter 131 is turned on, such that first "high" data stored in the latch unit 140 is applied to the IOL. If the read enable signal (EN_RD) is activated during the read operation, the receiver 122 is turned on, receives logic high data applied to the IOL, and transmits the logic high data to the bump pad 110.

Therefore, an embodiment of the present disclosure stores first data in the latch unit 140 within the base die 100, and reads first data on the condition that second inversion data is stored in an input/output line (IOL), such that the IOL can be tested and verified.

As is apparent from the above description, an embodiment of the present disclosure can test the base die having no cell using various patterns.

Those skilled in the art will appreciate that the embodiments may be carried out in other specific ways than those set forth herein without departing from the spirit and essential characteristics of the present disclosure. The above embodiments are therefore to be construed in all aspects as illustrative and not restrictive. All changes coming within the meaning and equivalency range of the appended claims are intended to be embraced therein. In addition, it is obvious to those skilled in the art that claims that are not explicitly cited in each other in the appended claims may be presented in combination as an embodiment or included as a new claim by a subsequent amendment after the application is filed.

Although a number of illustrative embodiments consistent with the present disclosure have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. An input/output (I/O) line test device comprising:
   an interface controller configured to perform signal transmission/reception between a pad and an input/output line (IOL);
   a signal transceiver configured to perform signal transmission/reception between the IOL and a through silicon via (TSV) based on a control signal;
   a latch unit configured to latch output data of the signal transceiver; and a test controller configured to output the control signal for controlling whether the signal transceiver performs a reception operation in response to a write enable signal and a test signal, wherein the input/output line (IOL) is included in a base die, wherein, if the reception operation of the signal transceiver is stopped when the test signal is activated, data received through the pad and the interface controller during a write operation mode is applied to the IOL.

2. The I/O line test device according to claim 1, wherein:
if the test signal is activated, the control signal is deactivated such that the reception operation of the signal transceiver is stopped; and
if the test signal is deactivated, the control signal is activated in response to the write enable signal such that the signal transceiver performs the reception operation.

3. The I/O line test device according to claim 1, wherein the interface controller includes:
a first transmitter configured to output data received from the pad to the IOL when the write enable signal is activated; and
a first receiver configured to transmit data received from the IOL to the pad when a read enable signal is activated.

4. The I/O line test device according to claim 1, wherein the signal transceiver includes:
a second transmitter configured to output data of the latch unit to the IOL when a read/write enable signal is activated; and
a second receiver configured to transmit data received from the IOL to the latch unit when the control signal is activated.

5. The I/O line test device according to claim 4, wherein the second receiver is turned off when the control signal is deactivated, such that data received from the input/output line (IOL) is blocked.

6. The I/O line test device according to claim 1, wherein the test controller deactivates the control signal when the test signal is activated, and controls activation or deactivation of the control signal in response to the write enable signal when the test signal is deactivated.

7. The I/O line test device according to claim 1, wherein the test controller includes:
an AND gate configured to perform a logic AND operation between the write enable signal and an inversion signal of the test signal.

8. An input/output (I/O) line test device comprising:
a first transmitter configured to output data received from a pad to an input/output line (IOL) when a write enable signal is activated;
a first receiver configured to output data received from the IOL to the pad during a read enable signal is activated;
a second receiver configured to output data received from the IOL when a control signal is activated;
a latch unit configured to store data received from the second receiver;
a second transmitter configured to output data of the latch unit to the IOL during the read/write enable signals are activated; and
a test controller configured to output the control signal for controlling whether to operate the second receiver in response to the write enable signal and a test signal,
wherein the input/output line (IOL) is included in a base die, wherein, if the second receiver stops operation when the test signal is activated, data received through the pad and the first transmitter during a write operation mode is applied to the IOL.

9. The I/O line test device according to claim 8, wherein:
if the test signal is activated, the control signal is deactivated such that the second receiver stops operation; and
if the test signal is deactivated, the control signal is activated in response to the write enable signal such that the second receiver starts operation.

10. The I/O line test device according to claim 8, wherein the test controller deactivates the control signal when the test signal is activated, and controls whether to activate the control signal in response to the write enable signal when the test signal is deactivated.

11. The I/O line test device according to claim 8, wherein the test controller includes:
a logic gate configured to perform a logic AND operation between the write enable signal and an inversion signal of the test signal.

12. An input/output (I/O) line test method comprising:
during a write operation, receiving, by a second receiver, first data received from a first transmitter through an input/output line (IOL) included in a base die, and storing the first data in a latch unit;
outputting a control signal for controlling a reception operation in response to a write enable signal and a test signal;
stopping an operation of the second receiver based on the control signal when the test signal is activated;
applying second data received through the first transmitter to the IOL during the write operation; and
during a read operation, outputting the first data stored in the latch unit to a pad after passing through a second transmitter, the IOL, and a first receiver.

13. The I/O line test method according to claim 12, wherein the first data is different from the second data.

14. The I/O line test method according to claim 12, wherein the first data is logic high data.

15. The I/O line test method according to claim 12, wherein the second data is logic low data.

16. The I/O line test method according to claim 12, further comprising:
deactivating the control signal for controlling the second receiver when the test signal is activated.

17. The I/O line test method according to claim 12, further comprising:
activating the control signal for controlling the second receiver when the test signal is deactivated.

18. The I/O line test method according to claim 12, wherein: during deactivation of the test signal,
if a write enable signal is activated, the control signal for controlling the second receiver is activated; and
if the write enable signal is deactivated, the control signal is deactivated.

19. An input/output (I/O) line test device comprising:
a latch unit configured for storing a first data;
a pad;
an I/O line coupled between the latch unit and the pad; and
a signal transceiver coupled between the I/O line and the latch unit,
wherein the I/O line test device is configured to provide the first data through the pad after second data is stored in the I/O line to verify the operation of the I/O line, wherein the input/output line (IOL) is included in a base die, wherein, if a reception operation of the signal transceiver is stopped when a test signal is activated, the second data received through the pad during a write operation mode is applied to the IOL.

20. The I/O line test device according to claim 19, further comprising:

an interface controller coupled between the pad and the I/O line;

wherein, during the write operation of the I/O line test device, receiving, by the signal transceiver, the first data received from the interface controller through the I/O line, and storing the first data in the latch unit.

21. The I/O line test device according to claim 20, further comprising:

a test controller coupled to the signal transceiver and configured to output a control signal for controlling whether the signal transceiver performs a reception operation in response to a write enable signal and the test signal.

22. The I/O line test device according to claim 21, wherein the test controller is configured to prevent the operation of the signal transceiver in response to an active test signal to apply the second data received through the interface controller to the I/O line.

23. The I/O line test device according to claim 20, wherein, during a read operation, outputting the first data stored in the latch unit to the pad after passing through the signal transceiver, the I/O line, and the interface controller.

24. The I/O line test device according to claim 19, wherein the latch unit is located within a base die and the base die is coupled to a core die by a through silicon via.

25. The I/O line test device according to claim 19, further comprising:

an interface controller configured to perform signal transmission/reception between the pad and the I/O line; and a test controller configured to output a control signal for controlling whether the signal transceiver performs a reception operation in response to a write enable signal and a test signal, wherein the latch unit is configured to latch output data of the signal transceiver, wherein the signal transceiver is coupled between the I/O line and a through silicon via (TSV).

* * * * *